United States Patent
Martin et al.

(10) Patent No.: US 9,663,092 B2
(45) Date of Patent: *May 30, 2017

(54) RAILCAR HANDBRAKE MONITOR

(71) Applicant: Amsted Rail Company, Inc., Chicago, IL (US)

(72) Inventors: Andrew Martin, West Chester, PA (US); Jeevan Robinson, Downingtown, PA (US); Wayne Murphy, Pottstown, PA (US)

(73) Assignee: Amsted Rail Company, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/684,994

(22) Filed: Apr. 13, 2015

(65) Prior Publication Data

US 2015/0232079 A1     Aug. 20, 2015

Related U.S. Application Data

(63) Continuation of application No. 12/861,713, filed on Aug. 23, 2010, now Pat. No. 9,026,281.

(51) Int. Cl.
*B60T 17/22*     (2006.01)
*B61H 13/02*     (2006.01)
*B60T 17/18*     (2006.01)

(52) U.S. Cl.
CPC .......... *B60T 17/228* (2013.01); *B61H 13/02* (2013.01)

(58) Field of Classification Search
None
See application file for complete search history.

(56) References Cited

U.S. PATENT DOCUMENTS 3,854,417 A * 12/1974 MacDonnell ........... B60T 17/22
                                                    105/355
4,134,464 A * 1/1979 Johnson ............... G01G 19/047
                                                    177/163

(Continued)

FOREIGN PATENT DOCUMENTS

EP          2650191 A1    10/2013
WO    2005/105536 A1    11/2005

OTHER PUBLICATIONS

International Search Report in WO Application No. PCT/US2014/072380, dated Apr. 27, 2015.

(Continued)

*Primary Examiner* — Krishnan Ramesh
(74) *Attorney, Agent, or Firm* — Fox Rothschild LLP

(57) ABSTRACT

A device for monitoring the status of a railcar handbrake having a hand operated handle, which device has a load bearing member configured to be inserted in the linkage of a railcar handbrake system so that the force applied to the brake system passes through the load bearing member. A strain gauge mounted on the load bearing member measures the strain. The information from the strain gauge is indicative of the force applied by the handbrake to the brake and is used to determine the status of the handbrake. Means for determining motion of the railcar is also provided. In one form, if it is determined that the brake is on and the railcar is in motion, information, such as an alarm, is transmitted. A system and method of monitoring a railcar handbrake are also provided.

25 Claims, 4 Drawing Sheets

(56) References Cited

U.S. PATENT DOCUMENTS

| | | | | |
|---|---|---|---|---|
| 4,296,707 A * | 10/1981 | Kennedy | B60T 17/228 | 116/58 A |
| 4,368,927 A * | 1/1983 | Billingsley | B61H 13/02 | 303/18 |
| 4,801,288 A * | 1/1989 | Schmitt | B61H 13/02 | 474/140 |
| 4,905,795 A * | 3/1990 | Rains | B61D 3/14 | 188/107 |
| 5,038,605 A * | 8/1991 | Tews | G01L 5/28 | 73/129 |
| 5,394,137 A * | 2/1995 | Orschek | B60T 17/221 | 188/1.11 E |
| 5,410,911 A * | 5/1995 | Severinsson | B60T 8/52 | 73/128 |
| 5,603,556 A * | 2/1997 | Klink | B60T 8/1837 | 303/198 |
| 5,701,974 A * | 12/1997 | Kanjo | B60T 7/18 | 188/1.11 R |
| 6,006,868 A * | 12/1999 | Klink | B60T 17/228 | 188/1.11 E |
| 6,014,600 A * | 1/2000 | Ferri | B60T 13/665 | 701/19 |
| 6,170,619 B1 * | 1/2001 | Sheriff | B60T 7/104 | 188/1.11 R |
| 6,175,784 B1 * | 1/2001 | Jicha | B61L 3/125 | 188/107 |
| 6,195,600 B1 * | 2/2001 | Kettle, Jr. | B60L 3/00 | 246/167 R |
| 6,237,722 B1 * | 5/2001 | Hammond | B60T 17/228 | 116/58 A |
| 6,397,978 B1 * | 6/2002 | Jackson | B61H 13/02 | 188/1.11 R |
| 6,474,450 B1 * | 11/2002 | Ring | B60T 7/02 | 188/1.11 R |
| 6,474,451 B1 * | 11/2002 | O'Brien, Jr. | B60T 7/042 | 188/1.11 R |
| 6,739,675 B1 * | 5/2004 | Scharpf | B60T 13/00 | 188/159 |
| 6,823,242 B1 * | 11/2004 | Ralph | B60T 17/228 | 340/682 |
| 7,114,596 B2 * | 10/2006 | Borugian | F16D 51/20 | 188/1.11 E |
| 7,180,019 B1 * | 2/2007 | Chiou | G01P 15/125 | 200/61.45 M |
| RE40,099 E * | 2/2008 | Stephens | B66C 13/16 | 177/147 |
| 7,336,156 B2 | 2/2008 | Arita et al. | | |
| 7,688,218 B2 | 3/2010 | LeFebvre et al. | | |
| 8,370,006 B2 | 2/2013 | Kumar et al. | | |
| 2002/0017439 A1* | 2/2002 | Hill | B60T 13/665 | 188/107 |
| 2002/0111726 A1* | 8/2002 | Dougherty | B60T 13/665 | 303/3 |
| 2003/0058091 A1* | 3/2003 | Petersen | B61H 13/02 | 340/457.3 |
| 2003/0097885 A1* | 5/2003 | Kell | G01L 5/101 | 73/862 |
| 2007/0062765 A1* | 3/2007 | Michel | B62L 1/10 | 188/1.11 R |
| 2007/0084676 A1* | 4/2007 | Vithani | B61H 13/02 | 188/1.11 E |
| 2007/0151812 A1* | 7/2007 | Michel | B61H 13/02 | 188/33 |
| 2007/0241610 A1 | 10/2007 | Smith | | |
| 2008/0179269 A1* | 7/2008 | Bachman | B66C 13/16 | 212/276 |
| 2008/0252515 A1* | 10/2008 | Oestermeyer | B61D 5/08 | 342/357.31 |
| 2009/0001226 A1* | 1/2009 | Haygood | B61K 9/00 | 246/169 S |
| 2009/0173840 A1 | 7/2009 | Brown et al. | | |
| 2010/0200307 A1* | 8/2010 | Toms | G01G 19/042 | 177/163 |
| 2012/0037435 A1* | 2/2012 | Duehring | B62M 7/14 | 180/11 |

OTHER PUBLICATIONS

International Search Report in related WO Application No. PCT/IB2013/03267, dated Apr. 23, 2015.

* cited by examiner

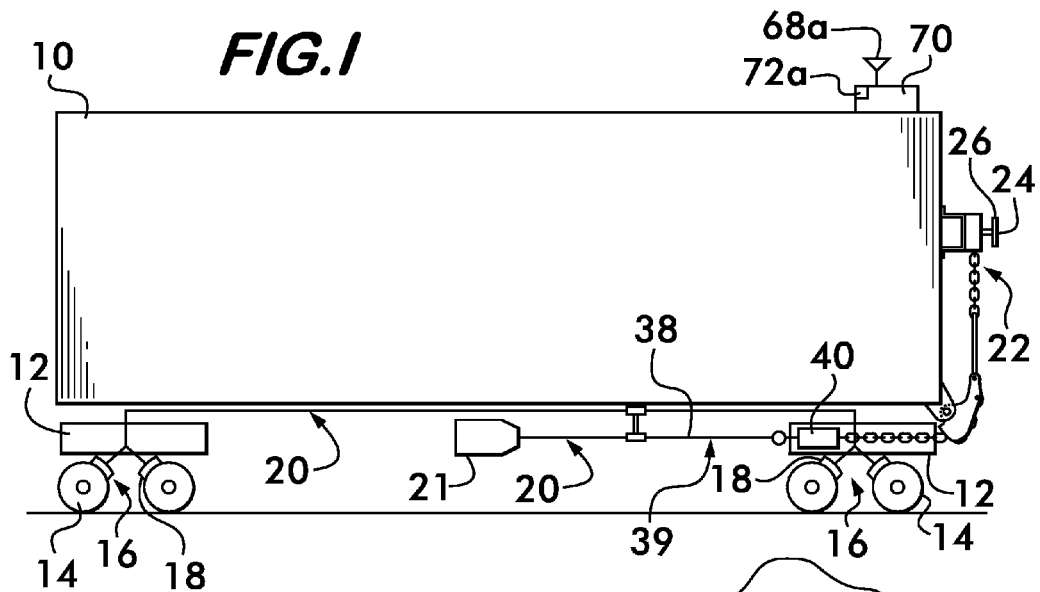
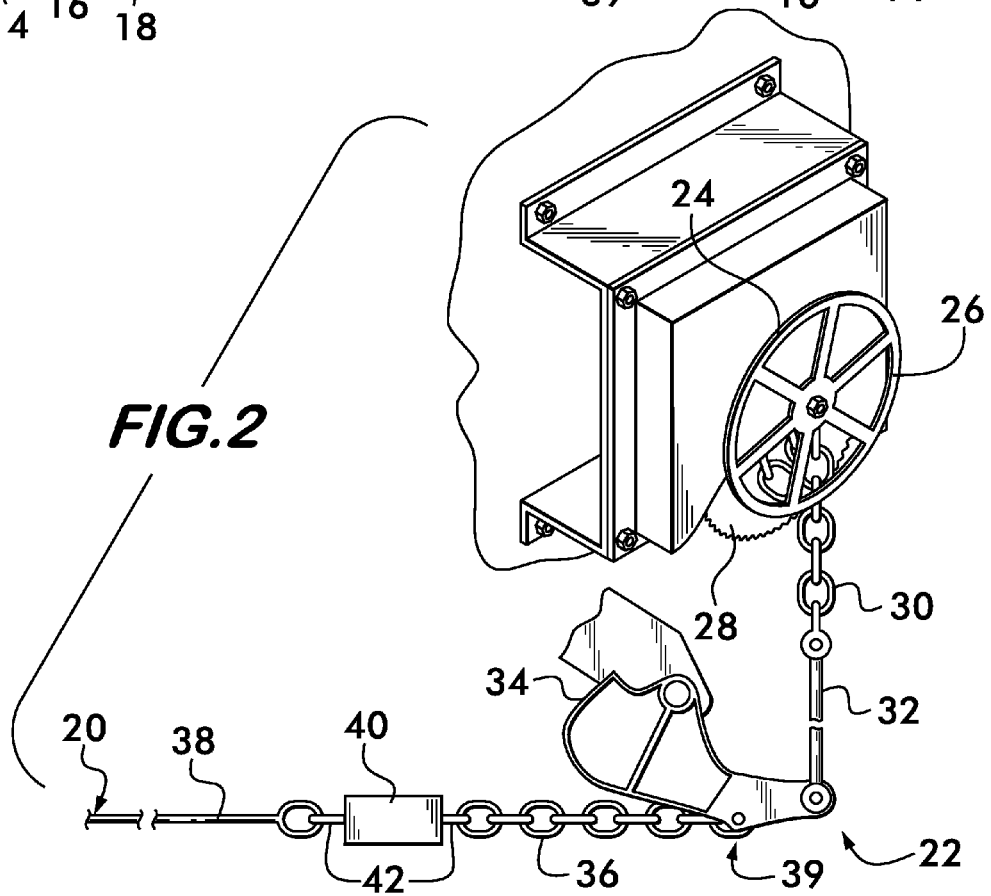

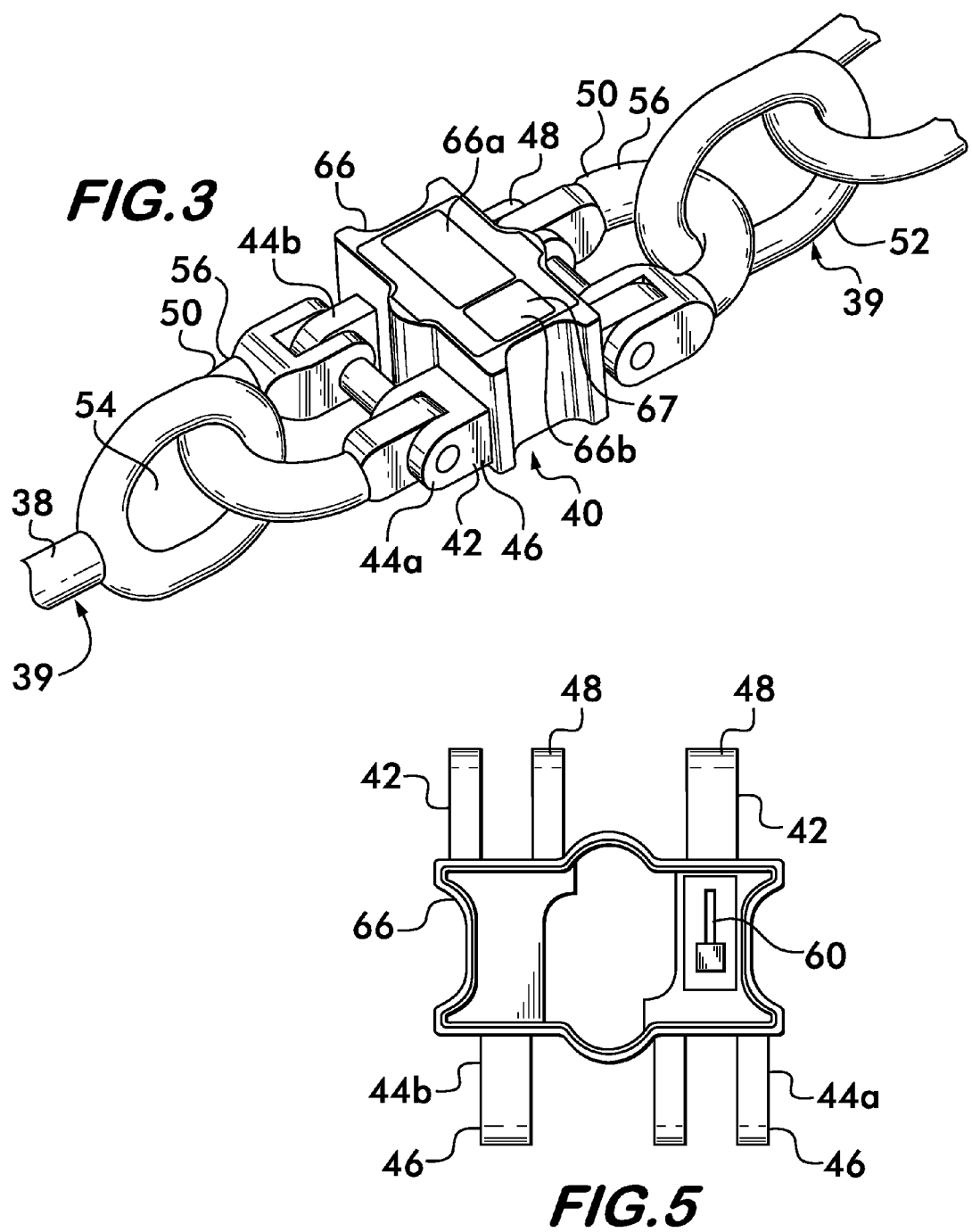

RAILCAR HANDBRAKE MONITOR

BACKGROUND OF THE INVENTION

1. Field of the Invention

The present invention relates to a device, system and method for monitoring the status of a railcar handbrake, and for providing an alert when the car is in motion while the handbrake is applied.

2. Description of the Related Art

Wheel damage in the railroad industry is responsible for significant maintenance costs. A common cause of wheel damage is moving the railcar while the handbrake is applied. If the handbrake is applied when the railcar is moving, the wheels of that car will not turn. Instead, they will slide on the rail, resulting in damage to the wheels, e.g., slid flats, spalling, shelling, etc. If these conditions are sufficiently bad to cause an individual wheel to be condemned, the wheel set must be replaced. Replacement of wheel sets requires the railcar to be removed from service and is one of the most expensive maintenance items for railcars.

Each railcar typically has a brake rigging on the underside of the railcar that includes an arrangement of rods, levers and chains forming a mechanical linkage connected to brake shoes which can be applied to rub against the train wheels, using friction to slow and stop the train. This brake rigging can be operated by an air cylinder that is part of a centralized train air brake system controlled from a central location, e.g., the locomotive. The air brake system is used to slow and stop entire trains.

Most railroad cars also have manually-operated mechanical hand brake devices that can set and release the brakes. They are used to maintain railcars at rest such as when in the rail yard or at a customer for loading and unloading. Manually operated handbrake devices typically operate at least a portion of the same brake rigging on the railcar used by the air brake system, bypassing the air cylinder to engage the brake shoes.

In one form, the handbrake has a manually operable hand wheel located on the B end of the railcar. The hand wheel is attached through gearing to a rotatable axle which in turn is attached to a chain running down the side of the railcar. The gearing provides mechanical advantage allowing a person to operate the hand wheel. The chain may be directly connected, or via a rod, to a bell crank or shive wheel which in turn connects to a chain and top rod that runs under the undercarriage of the railcar, and which ultimately links to the brake rigging. Turning of the hand wheel turns the gear to gather up the chain around the axle, pulling the chain in tension and pivoting the bell crank, which in turn tensions the chain and top rod under the undercarriage of the railcar to operate the brake rigging, and thereby apply the brakes. Sufficient tension will prevent the wheels from turning. Turning the hand wheel in the opposite direction will release the brakes. Other forms of handbrakes include a hand lever that is operated manually to apply tension to the chain or rod that operates the brakes in a similar manner as described above.

Since a handbrake is specific to a single railcar, it is not uncommon for inspectors to overlook an individual railcar when checking to ensure that the handbrakes are released. Thus the railcar may be moved with the handbrakes applied.

Presently, there is no reliable system for monitoring the status of a handbrake and for indicating movement of the railcar with the handbrakes applied. One common type of device, as disclosed in U.S. Pat. No. 3,854,417, provides a visual signal, such as an indicator flag, which extends on the railcar when the handbrake is on. However, an inspector must be sufficiently close to see the signal, and it is unlikely to be seen by the train crew when the car is part of a long train. Another device, disclosed in U.S. Pat. No. 4,296,707, provides a whistle sound when the handbrake is on and air is applied to the air brake system. This requires that someone be sufficiently close to hear the whistle. Accordingly, improved monitoring devices are desirable.

SUMMARY OF THE INVENTION

The present invention provides a device for monitoring the status of a railcar handbrake. The device includes a load bearing member configured to be inserted in the brake linkage so that a force applied to the brake through the brake linkage passes through the load bearing member. A strain gauge is mounted on the load bearing member to sense the force on it, and electrical circuitry is electrically connected to the strain gauge for obtaining information regarding the status of the handbrake. A power source is electrically connected to the electrical circuitry for providing power thereto. In one embodiment, if a threshold level of force is measured by the monitoring device, the brake is determined to be on. Information regarding the status of the handbrake, including whether it is on or off, can be communicated, such as by wireless transmission, to a remote receiver away from the railcar such as the locomotive or a remote monitoring station. A motion detection device can also be provided. If the hand brake is on and railcar movement is detected, information indicating that the railcar is in motion with the handbrake on can be transmitted to the remote receiver.

The present invention also provides a system for monitoring the status of a railcar handbrake of a railcar. The system includes a brake that engages a railcar wheel, the brake being operable by applying force thereto. A hand operated handle is mounted on the railcar and is operable to apply force to the brake. Connecting the handle to the brake is a linkage through which the force is transferred from the handle to the brake. A load bearing member is positioned in the linkage so that at least a portion of the force applied by the handle to the linkage passes through the load bearing member. A strain gauge is mounted on the load bearing member to measure the strain in it, and electrical circuitry is in communication with the strain gauge for receiving signals therefrom. The strain gauge measures the force on the load bearing member which is indicative of the status of the handbrake. The system can further include a communication device mounted on the railcar, the communication device being communicatively connected to the railcar brake monitoring device for receiving information therefrom. The communication device has a wireless communication device for transmitting information about the status of the railcar brake to a remote receiver. The system can further include a motion detection device for detecting motion of the railcar. If the brake is on and the railcar is moving, information, such as an alarm, can be sent to a remote receiver.

The present invention also provides a method of monitoring the status of a railcar brake operated by applying force to a linkage for engaging the brake. The method includes the following steps: (a) sensing the force applied to the linkage via a sensor; (b) determining if the force sensed in step (a) exceeds a predetermined threshold level chosen to indicate that that the brake is on; (c) detecting motion of the rail car; and (d) if in step (b) it is determined that the brake is on, and in step (c) it is determined that the railcar is in motion, causing a transmission of information indicating motion of the railcar with the brake on.

BRIEF DESCRIPTION OF THE DRAWINGS

The present invention will be more fully and completely understood from a reading of the Description of the Preferred Embodiment in conjunction with the drawings, in which:

FIG. 1 is a schematic of a railcar and railcar handbrake system showing the brake rigging and handbrake;

FIG. 2 is a schematic view of the handbrake linkage showing the monitoring device connected thereto;

FIG. 3 is a perspective view of the handbrake device of the present invention shown connected to the brake linkage of the railcar;

FIG. 5 is a top view of the handbrake device housing with various components removed showing the inter-links and the strain gauge.

DESCRIPTION OF PREFERRED EMBODIMENTS

Figure 4:
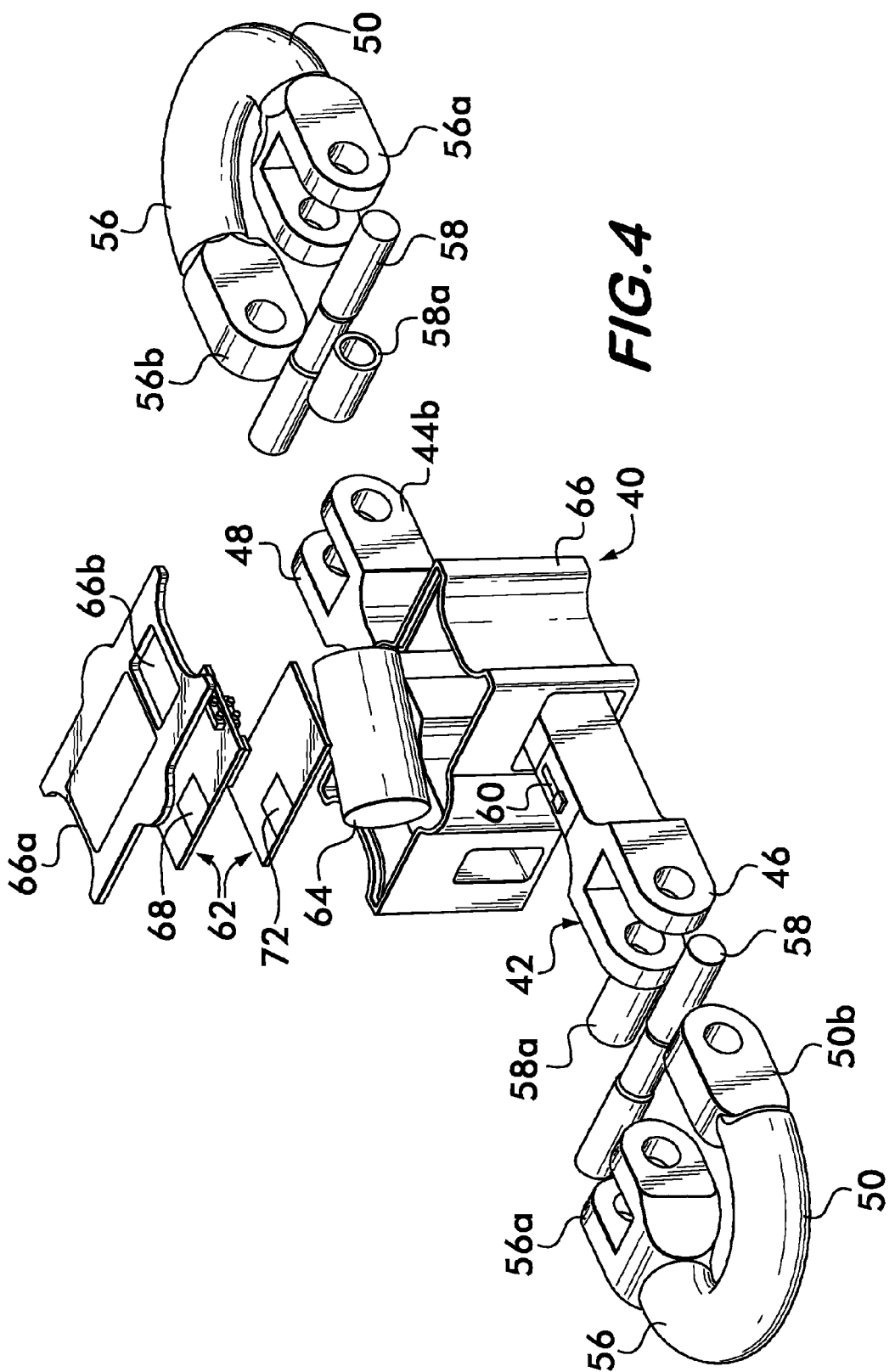
FIG. 4 is an exploded view of the handbrake device shown in FIG. 3.

A typical railcar brake system that includes a handbrake monitoring device of the present invention is now described with initial reference to FIGS. 1 and 2. A railcar 10 has trucks 12 supported on railcar wheels 14 as is known in the art. Brakes 16, which include brake pads 18, are urged against the wheels 14 to apply a braking force. The brakes are moved into and away from the wheels 14 by brake rigging 20 typically mounted underneath the railcar 10. As is known in the art, the brake rigging can include rods, levers and chains that are moved to operate the brakes 16. The brake rigging 20 can be operated by the train air brake system as is known in the art. Air brake systems typically include a pneumatic piston/cylinder unit 21 operatively linked to the rigging 20 so that the brakes can be controlled from a central location, such as the locomotive, by directing compressed air to the pneumatic piston/cylinder unit to move the rigging. It is appreciated that the air brake system is an automated system allowing braking of all the railcars of a train from a single location, and is used for slowing and stopping the entire train.

A railcar manually-operated handbrake 22 allows railcars 10 to be held stationary even when separated from a train, and without use of the air braking system. Each railcar 10 would have its own handbrake 22, which typically includes a hand operated handle 24 attached to the side of the railcar 10. The handle 24 is typically a hand wheel 26 but can take other forms such as a hand operated lever. The handle 24 in this case includes a small gear (not shown) for driving a larger gear 28 which has an axle as is known in the art. The gearing ratio provides mechanical advantage allowing a person to operate the hand wheel 26. A chain 30 is connected to the axle so as to be capable of being wound around it upon rotation of the axle. The chain is connected to a rod 32 which in turn is connected to a bell crank 34 which converts the vertical movement of the chain 30 on the side of the railcar to horizontal movement underneath the railcar 10. A second chain 36 connected at one end to the bell crank 34 and at its other end to a top rod 38 is ultimately connected to the brake rigging 20 as is well known in the art. It is seen that manual rotation of the handle 24 in one direction pulls the chain 30 upward. This in turn rotates the bell crank 34 counterclockwise as oriented in FIG. 2, which in turn moves the top rod 38 rightward, thereby operating the brake rigging 20 to engage the brakes 16. The various components connecting the handle 24 to the brake rigging 20, including the various chains and rods and bell crank, are referred to herein generally as the handbrake linkage 39. It is appreciated that turning the handle 24 applies a force or tension to the linkage 39, which force is transferred through the linkage 39 to the brakes 16. The greater the force applied by the handle 24, the greater the braking force on the wheels 14. The exact configuration of the handbrake linkage 39 varies depending on the railcar. For example, in some railcars the handbrake 22 will connect to the brake rigging 20 so as to operate the wheels 14 of only one truck 12, not the wheels of both trucks as in other cars.

A brake monitoring device 40 is installed preferably in the handbrake linkage 39 to monitor the force applied by the handbrake 22. In the illustrated embodiment, and with further reference to FIGS. 3, 4 and 5, the monitoring device 40 is a self contained unit that includes a load bearing member 42 inserted in the linkage 39 of the railcar handbrake 22 system so that the force applied to the brake 16 via the handle 24 passes through the load bearing member 42. Put another way, the force applied to the brake 16 via the handle 24 is transmitted through the load bearing member 42 to the brake. In the preferred embodiment, the load bearing member 42 is formed of two inter-links 44a, 44b adjacent and extending parallel to one another as shown, and U-shaped connectors 50 connecting the inter-links to the linkage 39. Each of the inter-links 44a, 44b have first and second ends 46, 48 connected to one another and to the linkage 39 via the U-shaped connectors 50 which are configured to connect on one end of the inter-links to a chain link 52 and on the other end to a rod opening 54 of the top rod 38 as shown. Any suitable means for being inserted into the linkage 39, depending on the linkage component to which it is to be connected, may be used. In the illustrated embodiment, each connector 50 takes the form of a clevis 56 having a forked end and a non-forked end. Clevises readily fit in existing chain links of hand brake systems 22. For example, the clevis 56 on the right in FIG. 4 has a forked end 56a for receiving a complimentary non-forked end of the inter-link 44a, and a non-forked end 56b for being received in corresponding forked end of the other inter-link 44b. The clevis 56 on the left in FIGS. 4 and 5 has a similar construction with the order of the forked and non-forked ends switched as shown. The connector clevises 56 and inter-links 44a, 44b are connected to one another via locking pins 58 and pin clips 58a as shown. The load bearing link 42, pins 58, etc., are preferably made of carbon steel or other suitable material having the requisite material strength. For example, the inter-links should be configured for a maximum typical brake load of 2400 lbs, some railcars going as high as 4800 lbs. It is believed that configuration for a maximum strength of 18,000 lbs is preferred. Powder coated carbon steel is a preferred material to prevent rust. As possible with the illustrated embodiment, the monitoring device 40 is preferably capable of being installed and replaced with standard tools.

Mounted on the load bearing member 42 is a sensor 60 for sensing the force applied to the linkage 39 for operating the handbrake 22. In the illustrated embodiment, the sensor takes the form of a strain gauge 60 to measure the strain in the member 42 as is known in the art (FIGS. 4 and 5). The strain gauge 60 can be used to determine the force (load) on the load bearing member 42. In the illustrated embodiment, the strain gauge 60 is attached to one of the load bearing member inter-links, here inter-link 44a, in any known manner. In the preferred embodiment, a low power foil full bridge gauge is mounted to the steel inter-link using an adhesive, such as a cyanoacrylate, in a manner to compensate for temperature changes as is known in the art. A second strain gauge could be placed on the other inter-link 44b, and the two strain measurements summed. However, it is believed that a strain gauge on one inter-link is satisfactory as the strain on the two inter-links 44a, 44b tends to average out.

Electrical circuitry 62 is provided in electrical communication with the strain gauge 60 for receiving signals therefrom and determining the status of the handbrake. The electrical circuitry 62 is preferably wired to the strain gauge 60 as is known in the art for receiving signals, e.g., voltage signals, indicative of the strain measured by the gauge 60. The strain measured can be calibrated to measure force or load as is well known in the art. The electrical circuitry 62 includes the components and wiring to receive and process the signals from the strain gauge 60. This can include, but is not limited to, analog and digital circuitry, CPUs, processors, circuit boards, memory, firmware, controllers, and other electrical items, as required to operate the strain gauge 60 and process the signals as further described below, including communication circuitry and devices, GPS circuitry and devices, and motion detection circuitry and devices. In the illustrated embodiment, two circuit boards 62 are provided, one board having the strain gauge circuitry, the other the communications circuitry.

It is appreciated that the electrical circuitry 62 of the monitoring device 40 obtains information related to the status of the handbrake 22, here strain and force information on the linkage 39 due to the application of the handbrake 22. For example, if the handbrake 22 is applied, the force in the linkage 39 will be higher than if the handbrake is not applied. The higher the force in the linkage, the greater the braking force applied. Thus the monitoring device 40 obtains information related to the status of the handbrake and which can be used to determine additional information related to the status of the handbrake, e.g., is the brake on or off and/or the percentage of maximum braking force applied. This additional information can be determined by the electrical circuitry 62 itself or by another device to which the information is communicated. In the illustrated embodiment, and as further described below, electrical circuitry 62 of the device 40 includes firmware that can use the information obtained from the sensor 60 to determine if the brake is on or off, among other capabilities, and then communicate this information elsewhere. Information related to the status of the handbrake 22 thus includes the raw data collected from the sensor 60 as well as the final determination of the status of the handbrake.

A power source 64 is electrically connected to the electrical circuitry 62 for providing power thereto. Any suitable power source can be provided. In the preferred embodiment, the power source 64 is provided by a C cell lithium-thionyl chloride battery of military grade mounted on the device 40. Ultra low power electrical components that consume the minimum amount of power are preferred to extend the life of the device 40.

The preferred embodiment of the device 40 further includes a housing 66 supported on the load bearing member 42 for housing the various components within it, e.g., the electrical circuitry 62 and power source 64. As seen in the Figures, the load bearing member inter-links 44a, 44b pass through the housing 66, and the strain gauge 60 is mounted on the portion of inter-link 44a within the housing 66, the housing thereby containing the gauge 60, wiring and other associated components within. The housing is preferably weatherproof, and made of any suitable material such as a UV rated polymer. The various components are mounted and electrically connected within the housing 66. After the various components are installed within it, the housing 66 is filled with a potting material 67 to maintain, encapsulate and environmentally seal the components within. Any suitable electrical potting material capable of protecting the electric circuitry and components from the harsh railroad environment can be used, where harsh weather, UV exposure, humidity, vibration, mechanical impact, thermal shocks and abrasion might occur while the device is in operation. Such materials include epoxies, polyurethanes and silicone compounds. A flexible urethane suitable for electrical use and through which wireless signals of the frequencies to be used can be transmitted is preferred. The housing 66 includes a housing lid 66a having an opening 66b through which the potting material can be applied.

Figure 6:
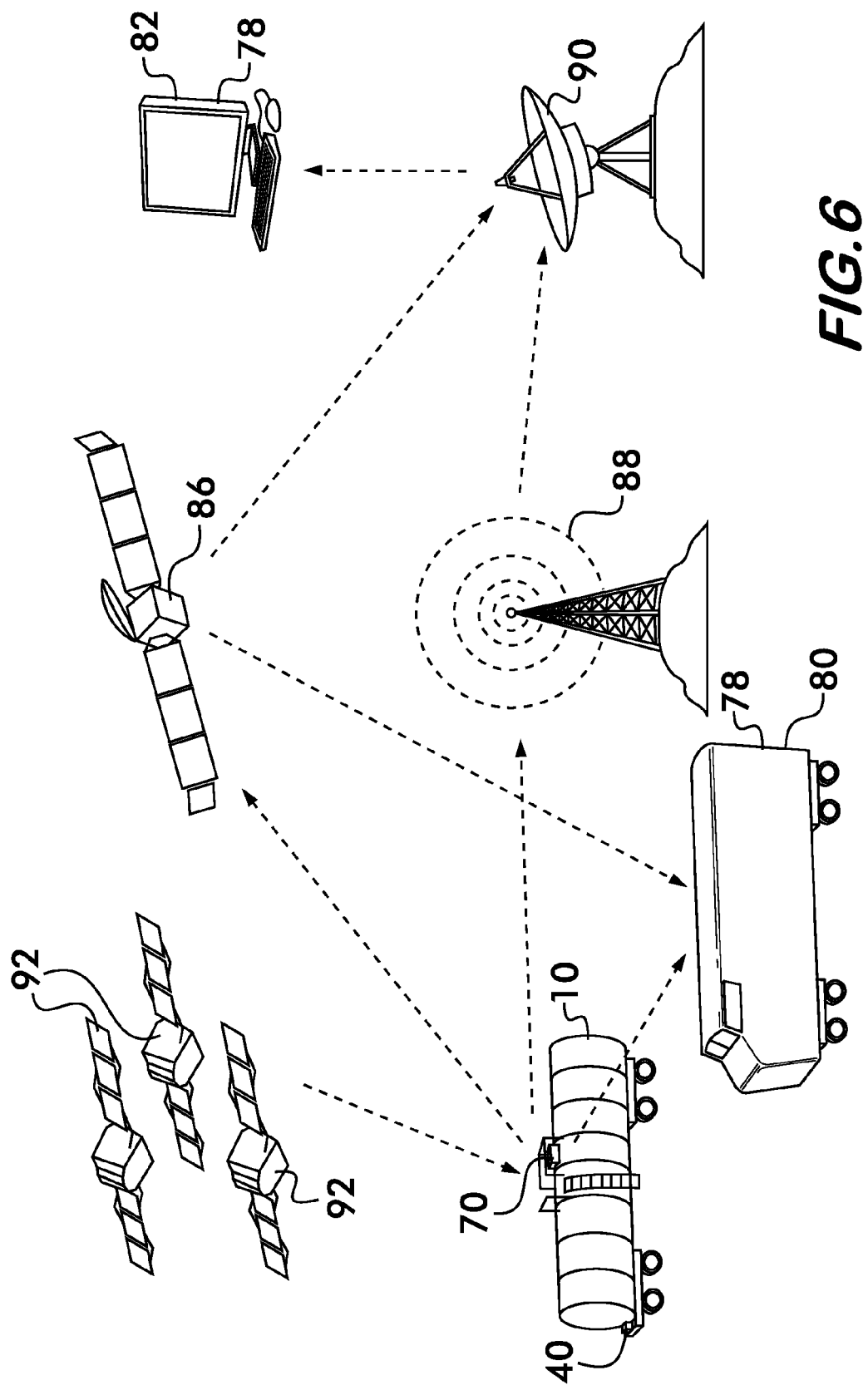
FIG. 6 is a schematic view of an exemplary system for monitoring and reporting the status of a railcar handbrake using the device shown in FIG. 3.

In one preferred embodiment, and with further reference to FIG. 6, the monitoring device 40 forms part of a system for monitoring the status of the railcar handbrake 22 and for reporting the information regarding the brake status to a person or location where the information can be reviewed and acted upon as desired. This requires the communication of information related to the status of the handbrake to a remote receiver 78 located elsewhere. The remote receiver 78 can be any desired location to where the information is to be forwarded for review, display, recording, record keeping, alerts, phone alerts, e-mail alerts, monitoring, alarms, analysis, etc., and includes the locomotive 80 where the crew is located, a ground based computer system 82 where the information can be recorded, analyzed and reviewed, monitoring stations, to the owner of the railcar for monitoring, or any other remote receiver where it is desired to forward the information. The information can be forwarded to one or more remote receivers 78 depending on the configuration desired. The information can take any form including, but not limited to, telemetry, signals, data, alerts, alarms, and the like, whether analog, digital or other.

In one form, the means for communicating information related to the status of the handbrake from the monitoring device 40 to a remote receiver 78 includes a wireless communication device 68 mounted within the monitoring device 40 as part of the circuitry 62. Any type of wireless device can be used, which includes any suitable device that can transfer information without the use of wires, e.g. radio frequency (RF), infrared light, laser light, visible light, acoustic energy, etc. For long life, it is preferred to provide a low power wireless communication device. Accordingly, rather than having the monitoring device 40 communicate directly with the remote receiver 78 via a satellite 86, cellular telephone system 88, or other far away receiver/transmitter which would require additional power, a separate communication device 70 can be provided on the train, preferably on the railcar 10 itself (FIGS. 1 and 6), which is communicatively connected to the monitoring device 40 to receive information therefrom. The communication device 70, also referred to herein as a communication management unit 70 (CMU) to distinguish it from other devices, includes any device capable of receiving information related to the status of the handbrake and transmitting information related to the status of the handbrake to the remote receiver 78. Such a communication device 70 preferably is a single self contained unit that serves as a communications link to other locations, and has its own electrical circuitry, which can include, but not limited to, analog and digital circuitry, CPUs, processors, circuit boards, memory, firmware, controllers, power source, motion detectors, communication devices, etc. to process and forward the information received, carry out any programming and decision making as desired, and work with the monitoring device 40 as required. The CMU includes a wireless communication device 68a for communicating with remote receivers 78. In one preferred embodiment, it can also communicate with, control and/or monitor other devices on the railcar 10. An example of such a device and system is described in U.S. Pat. No. 7,688,218 which is incorporated herein by reference.

The brake monitoring device 40 can communicate information to the CMU 70 via the wireless communication device 68, or by hardwire. Where a wireless device 68 is provided in the monitoring device 40, such as for communicating with the CMU 70, any suitable low power device can be used, an ultra low power 802.11 or 802.15.4 device operating in the 2.4 GHz frequency band being preferred. Wireless devices using a frequency-hopping spread spectrum (FHSS) method of transmitting radio signals and a Time Synchronized Mesh Protocol are preferred for security and ultra low power usage. Means to register the monitoring device 40 with the CMU 70 so that the monitoring device 40 is recognized and distinguished from other devices by the CMU are known in the art.

An example of a preferred system and method of monitoring and reporting the status of a railcar handbrake 22 is now described with reference to FIGS. 1 through 6. The sensor 60, here the strain gauge 60, is added to the hand brake linkage 39 so as to be capable of sensing the force or load applied by the mechanically operated handle 24 to the linkage 39. The sensor 60 is preferably mounted on the linkage 39 between the brake handle 24 and brake rigging 20 to sense the load due to the application of the handbrake. Insertion of the monitoring device 40 into the linkage 39 is one way to carry out this step; applying the sensor to a chain, rod or other load bearing component of the linkage 39 is another. The electrical circuit 62, in communication with the strain gauge 60 for receiving signals therefrom, is capable of obtaining information regarding the status of the handbrake, here determining the amount of force on the inter-link of the load bearing member 42. Next, using the firmware of the circuitry 62, it is determined if the amount of force exceeds a predetermined threshold level indicating that the brake is on. For example, in a preferred embodiment, this threshold level is met if a force of 800 lbs or higher is measured in the linkage 39, which is believed to be sufficient to apply the brakes. If it is determined that the brake 16 is on, information indicating that the brake is on can be communicated elsewhere to a remote receiver 78. The monitoring device 40 and CMU 70 as part of a system can carry out this method, the device 40 communicating the information about the handbrake 22 to the CMU 70 via wireless communication device 68, the CMU then forwarding this and/or other further processed information about the handbrake to the remote receiver 78 via the wireless communication device 68a. As an alternative embodiment, although likely requiring higher power components, brake monitoring device 40 can carry out this method by itself.

Although a basic preferred system and method has been described, it is appreciated that additional and more advanced steps are possible. An additional feature can include detecting motion of the railcar 10. In one embodiment, this can be provided with a motion detection device 72 located in the brake monitoring device 40, which can be part of the electrical circuitry 62, or located in the CMU 70. Such motion detection devices can include, but not limited to, accelerometers, motion sensors, gyroscopes, mechanical devices, tilt sensors, GPS devices, etc. Preferred accelerometers include ultra lower power devices such as digital accelerometer model number ADXL345 from Analog Devices, Inc.; preferred mechanical motion detectors include ultra low power devices such as tilt and vibration sensor model number SQ-SEN-200 from SignalQuest, Inc; preferred GPS devices include model Sid Star IV GSD4t from SiRF Technology, Inc. Those skilled in the art appreciate that the motion detection device 72 can include one or more such devices that work together and which can be located together or remote from one another. If it is determined that the handbrake 22 is on and the railcar is in motion, information indicating that the brake is on and the railcar is in motion, such as an alarm, can be communicated via wire or by wireless communication device 68 to the CMU 70 for further processing and transmission to the remote receiver 78 where the information can be acted upon. Alternatively, this information regarding the status of the handbrake, brake on and railcar in motion, can be sent directly from the monitoring device 40 to the remote receiver 78. The electrical circuitry 62 of the monitoring device 40 can include the necessary components and firmware to make this determination.

As discussed above, a motion detection device 72a can be alternatively located in the CMU 70, or in the CMU in addition to the motion detection device 72 located in the monitoring device 40. If motion is detected by the CMU 70, and the CMU received information from the monitoring device 40 indicating that the brake is on, then the CMU would transmit the information indicating that the brake is on and the railcar 10 is in motion. It is appreciated that in alternative embodiments the monitoring device 40 need not make the determination that the brake is on or off, but that sufficient information regarding the handbrake, e.g., raw strain gauge or force data, can be communicated elsewhere, such as to the CMU 70, where the final determination of the status of the handbrake can be determined, e.g., on or off. It is appreciated that the monitoring device 40 can be a self contained stand alone unit having all the components necessary to carry out the steps necessary to warn that the train is moving while the handbrake is on, or work with the CMU 70 or other devices to carry out the desired steps.

The transmission of the information regarding the handbrake 22 to the remote receiver 78 can be by any known means, e.g., satellite 86, cell phone system 88, etc. If the transmission is to be sent to the locomotive 80, a direct transmission from the CMU 70 or monitoring device 40 could be used, although due to power requirements, it is preferred in the illustrated embodiment to have the monitoring device 40 transmit low power signals wirelessly to the CMU 70, and the CMU transmit to the locomotive or other remote receiver 78. The transmission of the information regarding the handbrake 22 to the remote receiver 78 can also be by way of an inter-train communication system such as an Electronically Controlled Pneumatic (ECP) Brake system as is known in the art, to which the monitoring device 40 and/or CMU can communicate by wire or wirelessly. As yet another option, the transmission of the status of the handbrake 22 to the remote receiver 78 can be by way of Automatic Equipment Identification, AEI data tag systems, as used by railroads and which typically have a wayside reader to wirelessly receive information from the railcars as they pass by.

It is appreciated that the device, system and method of the present invention can be tailored to the specific requirements of a user. Unlimited variations are possible. Further embodiments, steps, capabilities and advantages of the present invention are now described.

The monitoring device 40 is preferably installed anywhere in the linkage 39 connecting the handbrake handle 24 to the brake rigging 20. In the embodiment described above and shown in FIGS. 2 and 3, it is connected using the clevises 56 at one end to a link 52 of the chain which is connected to the bell crank, and at the other end to the top rod 38. The clevises allow easy installation of the monitoring device 40 in the field.

Other embodiments for the load bearing member 42 can be used. For example, in another embodiment, two clevises are attached to one another without the inter-links, and which have at least one strain gauge 60 mounted thereon. The housing 66 containing the various components can be mounted on or between the clevises.

In operation, the monitoring device 40 can sample the strain gauge 60 intermittently to preserve power and increase battery life. For example, in one embodiment the monitoring device 40 powers up every 30 seconds to read the strain gauge 60. Any other sample period can be used, e.g., 5 second periods are used in another embodiment.

Once the monitoring device 40 powers up to take a reading of the load on the handbrake, numerous samples can be taken and averaged. For example, 16 readings can be taken in less than a second after a small delay, e.g., 10-20 ms, to allow the system to settle once powered up. The 16 samples can be averaged as is known in the art. Debounce circuits to filter out noise as is known in the art can be used. The averaged reading is compared to a threshold value indicative of the force required to apply the handbrakes. If the threshold value is not met, i.e., the brake is off, the monitoring device 40 goes back to sleep, i.e., de-powers to conserve energy until the next sample period. If there is a change in status, additional steps are taken as discussed below. The status of the brake, at least the status based on the previous reading, is stored in memory within the monitoring device 40, e.g., whether the brake is on or off.

As previously discussed, a load of 800 lbs force on the linkage 39 is believed sufficient to apply the brakes 16. Accordingly, in the preferred embodiment, the monitoring device 40 is configured to determine that the brake is on at the threshold level of 800 lbs or higher, and off below 800 lbs. The device 40 can be configured for other threshold levels as may be warranted or desired.

In a preferred embodiment, if the handbrake is on, and railcar motion is detected, such information regarding the status of the handbrake 22 is transmitted to a remote receiver 78. Where the motion detector device 72a is included in the CMU 70, the information indicating that the handbrake is on is communicated from the monitoring device 40 to the CMU 70, via wired or wireless transmission. If the CMU 70 determines that the railcar 10 is in motion, both conditions now satisfied—brake is on and railcar motion is detected—information of such condition is sent to the desired remote receiver location 78. The information is preferably transmitted using various known means. There are various means to detect motion as previously discussed, one example using a GPS system 92 to monitor for movement of the railcar 10 a certain distance, such as 50 feet, upon which the railcar 10 is considered to be in motion. Other means, such as those using the devices previously discussed, e.g., the accelerometer, are also known.

If the threshold level of 800 lbs is met indicating that the brake is on, but there is no change in status from the previous reading, i.e., the previous sample determined that the brake is on, then the monitoring device goes back to sleep. Thus, if the brake 16 was on as determined by the previous reading of the monitoring device 40, and someone merely turns the brake handle 24 to increase the load on the handbrake, there is no change in status and the monitoring device 40 goes back to sleep.

As an alternative, any change in status can cause information regarding the status of the handbrake to be sent. For example, if the brake 16 goes from on to off, or from off to on, information can be sent to the remote receiver reporting the change in status. As another alternative, information regarding the status of the brake can be sent after each sampling whether or not there is a change in status. This information, as discussed above, is preferably sent by wireless transmission from the monitoring device 40 to the CMU 70, which then transmits information regarding the brake status to the remote receiver 78.

An additional feature and advantage is the ability to measure the actual load on the linkage 39 applied by the handbrake 22 and communicate this information to the remote receiver 78. For example, the monitoring device 40 can be programmed to make regular status checks, e.g., at regular intervals 4 times a day. At the predetermined time, the monitoring device 40 powers up and samples the strain gauge 60. The information regarding the status of the handbrake 22, here whether the handbrake is on or off, and/or the actual load measured, can be communicated to the CMU 70 for transmission to the remote receiver 78. In addition to or instead of the actual load, the load measured as a percentage of the maximum load possible can be determined and forwarded to a remote receiver 78. As another possibility, even if the brake is off (the load is less than 800 lbs), the actual load and or percentage of the maximum load on the linkage 39 of the handbrake 22 can be determined and forwarded, such information being capable of indicating if the brakes are partially applied.

Another feature and advantage is the ability to determine the distance the railcar 10 moved while the handbrake is on, and forwarding this information to the remote receiver 78. This can be carried out by use of the motion detector, e.g., the GPS.

As discussed above, the present invention provides a handbrake monitoring device, system and method. One key feature and advantage is the ability to monitor the handbrake 22 and, if it is determined that the handbrake is on and the railcar 10 is in motion, such information can be sent warning that corrective action is required. Real time data about the handbrake can be collected and forwarded to a remote receiver 78. Other embodiments provide for the determination and transmission of the actual load on the handbrake 22, or even a determination and transmission of the load as a percentage of the maximum load possible on the handbrake. Also, regular samples of the status of the handbrake can be made and transmitted. In a preferred embodiment, the monitoring device can work with a CMU 70, but it is contemplated that the monitoring device 40 can contain the suitable components to act as an individual unit. In summary, infinite variations are possible depending on the configuration desired.

It is understood that the foregoing description is intended to describe certain embodiments of the present invention, and is not intended to limit it in any way. The invention is to be read as limited by its claims only.

What is claimed is:

1. A device for monitoring the status of a handbrake on a railcar which has a brake linkage for transferring a force from the handbrake to a railcar brake, said device comprising:
   a load bearing member configured to be inserted in the brake linkage so as to be tensioned by and transfer there through at least a portion of the force applied by the handbrake to the railcar brake;
   a strain gauge mounted on said load bearing member to measure the force being transferred through said load bearing member to the railcar brake;
   electrical circuitry in communication with said strain gauge for obtaining information regarding the status of the handbrake, said circuitry being configured to determine if the force measured exceeds a predetermined threshold level indicating that the railcar brake is on; and
   a power source electrically connected to said electrical circuitry for providing power thereto.

2. A device in accordance with claim 1 wherein said circuitry includes firmware capable of determining if the force measured exceeds a predetermined threshold level indicating that the railcar brake is on.

3. A device in accordance with claim 1 wherein said load bearing member comprises two inter-links adjacent to one another and a connector removably attached to each of said inter-links.

4. A device in accordance with claim 3 wherein the force said strain gauge is mounted to at least one of said inter-links.

5. A device in accordance with claim 1 wherein the load bearing member is configured to be tensioned by and transfer the force applied by the handbrake to the railcar brake.

6. A device in accordance with claim 1 wherein said electrical circuitry further comprises a wireless communication device for transmitting information regarding the status of the railcar brake.

7. A device in accordance with claim 1 further comprising a housing, wherein a section of said load bearing member passes through said housing, and said strain gauge is mounted on said section of said load bearing member.

8. A device in accordance with claim 1 further comprising a motion detection device for detecting motion of the railcar.

9. A device in accordance with claim 8 wherein said motion detection device is selected from the group consisting of a global positioning system (GPS) device, an accelerometer, and a mechanical motion sensor.

10. A system for monitoring the status of a handbrake on a railcar which has a brake linkage for transferring a force from said handbrake to a railcar brake, said system comprising:
    a device for monitoring the status of the handbrake as set forth in claim 1; and
    a communication management unit (CMU) which is positionable on the railcar, said CMU communicatively connected to said monitoring device to receive therefrom information regarding the status of the railcar brake, said CMU further comprising a wireless communication device for transmitting information regarding the status of the railcar brake to a remote receiver.

11. A system in accordance with claim 10 further comprising a motion detection device for detecting motion of the railcar.

12. A system in accordance with claim 11 wherein said CMU includes said motion detection device.

13. A system in accordance with claim 11 wherein said monitoring device includes said motion detection device.

14. A system in accordance with claim 10 further comprising firmware capable of determining if the force measured exceeds a predetermined threshold level indicating that the railcar brake is on.

15. A system in accordance with claim 14 wherein said firmware is included in said monitoring device.

16. A method of monitoring the status of a brake on a railcar which is operated by transferring a force to said railcar brake through a linkage, said method comprising the following steps:
    (a) measuring the force transferred through the linkage to the railcar brake, said measuring including the use of a load bearing member attached to said linkage such that at least a portion of the force transferred through the linkage to the railcar brake passes through said load bearing member where it is measured by a sensor;
    (b) determining if the force measured in step (a) exceeds a predetermined threshold level chosen to indicate that the brake is on; and
    (c) if in step (b) it is determined that the brake is on, causing a transmission of information indicating that the brake on.

17. A method in accordance with claim 16 wherein step (a) is carried out by a strain gauge.

18. A method in accordance with claim 16 wherein step (b) is carried out by firmware configured to determine if the force measured exceeds a predetermined threshold level indicating that the brake is on.

19. A method in accordance with claim 18 further comprising the step of transmitting information indicating the amount of the force applied to the linkage.

20. A method in accordance with claim 16 wherein step (b) is carried out by a monitoring device attached to said linkage, said monitoring device including said load bearing member, said sensor and electrical circuitry electrically connected to said sensor.

21. A method in accordance with claim 20 wherein step (c) is carried out by a communication device included with said monitoring device.

22. A method in accordance with claim 20 wherein step (c) is carried out by a communication device separate from said monitoring device.

23. A method in accordance with claim 16 further comprising the following steps:
    (d) detecting motion of the rail car, and
    wherein step (c) further comprises that if in step (b) it is determined that the brake is on and in step (d) it is determined that the railcar is in motion, causing a transmission of information indicating that the railcar is in motion and the brake is on.

24. A method in accordance with claim 23 wherein said monitoring method is repeated intermittently to preserve power.

25. A method in accordance with claim 16 wherein said monitoring method is repeated intermittently to preserve power.

* * * * *